United States Patent [19]
Toyoda et al.

[11] Patent Number: 4,701,804
[45] Date of Patent: Oct. 20, 1987

[54] IMAGE READING APPARATUS

[75] Inventors: Kenji Toyoda, Chigasaki; Toru Hishinuma, Tokyo, both of Japan

[73] Assignee: Nippon Kogaku K.K., Tokyo, Japan

[21] Appl. No.: 730,046

[22] Filed: May 3, 1985

[30] Foreign Application Priority Data

May 11, 1984 [JP] Japan .................................. 59-94055

[51] Int. Cl.⁴ ............................................. H04N 1/40
[52] U.S. Cl. .................................. 358/280; 358/285; 358/294; 382/59
[58] Field of Search ............... 358/256, 264, 265, 280, 358/282, 285, 293, 294, 288; 382/59

[56] References Cited

U.S. PATENT DOCUMENTS

| 3,346,692 | 10/1967 | Garfield et al. | 358/256 |
| 3,541,248 | 11/1970 | Young | 358/294 X |
| 3,993,865 | 11/1976 | Browne et al. | 358/256 |
| 4,367,493 | 1/1983 | Matteson | 358/288 |
| 4,405,951 | 9/1983 | Omori et al. | 358/264 X |
| 4,591,727 | 5/1986 | Gaebelein et al. | 358/288 |
| 4,628,368 | 12/1986 | Kurata et al. | 358/288 |
| 4,661,857 | 4/1987 | Kondo | 358/288 |

*Primary Examiner*—Edward L. Coles, Sr.
*Attorney, Agent, or Firm*—Shapiro and Shapiro

[57] ABSTRACT

An image reading apparatus converts information of an original into electrical signals using a one-dimensional image sensor. In the apparatus, an image of an object is converted into an image signal, the image signal is memorized to be read out as needed, and the amount of image signal memorized can be detected.

5 Claims, 8 Drawing Figures

IMAGE READING APPARATUS

BACKGROUND OF THE INVENTION

1. Field of the Invention

The present invention relates to an image reading apparatus which converts image information of an original into electrical signals using a one-dimensional image sensor such as a CCD line sensor and for printing or recording the obtained electrical signals on a medium such as a magnetic tape.

2. Description of the Prior Art

Preparation of various documents is one of the most important tasks in office work, and demands for rationalization and savings in labor in preparation of documents are high. In response to such demands, typewriters, copying machines or facsimile systems have been devised and are in use. However, the capacity and performance of such OA equipment is limited, and optimal efficiency in office work has not been attained.

For example, preparation of summaries of portions of documents or literature and of filing cards listing keywords or the like has become increasingly important in a society flooded with information. However, no easy means for performing such tasks have been devised, and currently one can only extract desired portions of a document and manually rearrange these on sheets of paper. With this means, most of the copied images are wasted, and labor involved in extracting and rearranging the desired portions of documents and so on is considerable.

SUMMARY OF THE INVENTION

It is an object of the present invention to provide an image reading apparatus which can record only desired portions of an original or the like.

In order to achieve the above object of the present invention, an image of an object is converted into an image signal, the image signal is memorized (stored in a memory) in such a manner that it can be read out as needed, and the amount of image signal stored in this manner can be detected.

DETAILED DESCRIPTION OF THE PREFERRED EMBODIMENTS

Figure 1:
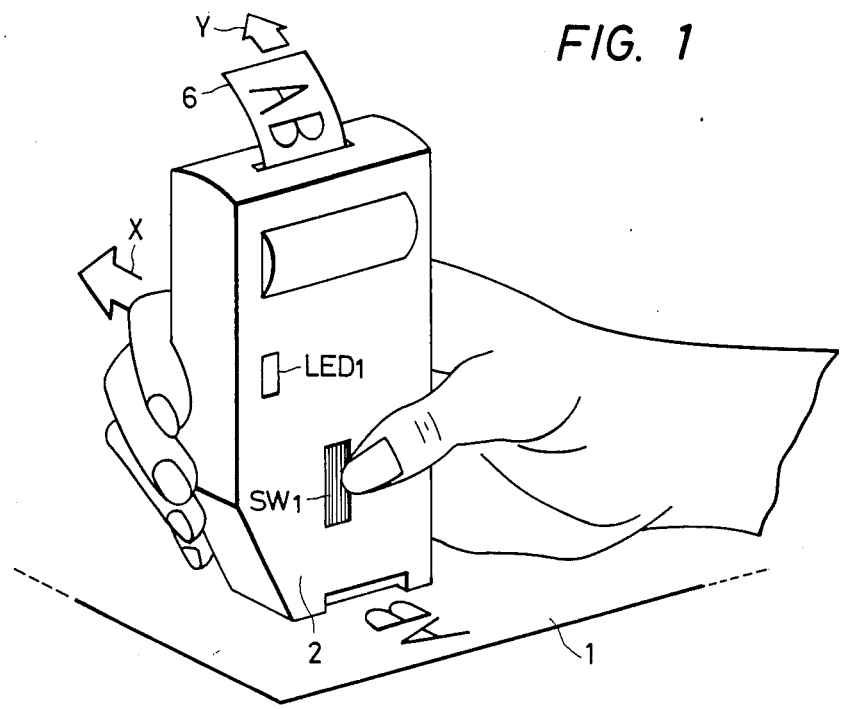
FIG. 1 is a perspective view showing the outer appearance of an apparatus according to the present invention.
Figure 2:
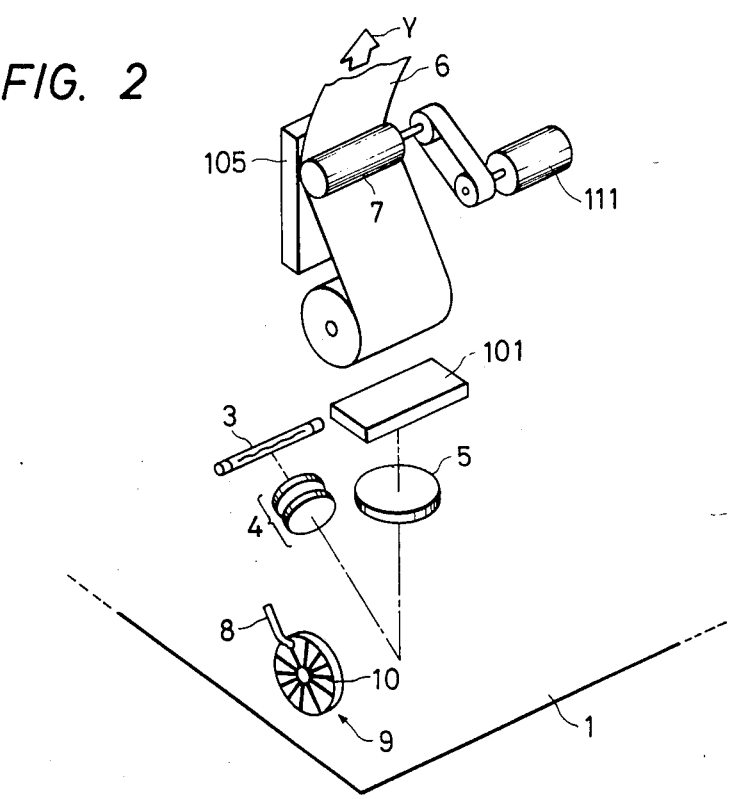
FIG. 2 is a view showing the internal structure of the apparatus according to an embodiment of the present invention.

FIG. 1 shows the outer appearance of an apparatus according to a first embodiment of the present invention, and FIG. 2 shows the internal structure thereof. A housing 2 is placed on a desired portion of an original 1 and is moved by hand in a direction indicated by arrow X while depressing a scan switch SW1. The original is illuminated with light from a tubular illumination lamp 3 through a condenser lens 4. An image of the illuminated portion of the original is formed on a pickup surface of a CCD line sensor 101 having a one-dimensional light-receiving surface by an imaging lens comprising an optical system 5. The image information thus read by the line sensor 101 is converted into an image electrical signal (to be referred to as an image signal hereinafter) which represents the light-intensity distribution on the light-receiving surface. After the image signal is temporarily stored in a memory by a method to be described later, it is supplied to a thermal head 105 which prints an image corresponding to the input signal on thermal paper 6.

A platen 7 feeds the thermal paper 6 to the thermal head 105 in a direction indicated by arrow Y. A motor 111 drives this platen 7. The scanning direction of the line sensor 101 (the scanning of the line sensor 101 will be referred to as the main scanning hereinafter) is set to be perpendicular to the moving direction (direction indicated by arrow X) of the overall apparatus in the user's hand. Thus, the movement of the apparatus performs subscanning. In this manner, the image of the original is sequentially read by the image reading apparatus at a constant width which is determined by the length of the light-receiving surface of the line sensor and the characteristics of the imaging optical system 5. A friction wheel 9 rotates as the apparatus is moved. A semiconductor pattern 10 is formed on one surface of the wheel 9 and constitutes an encoder 100 together with a brush 8. The encoder 100 feeds the data on moving speed and moving distance of the apparatus to a control circuit thereof.

In an apparatus of this type, the manual input operation of the image information, i.e., the subscanning speed may be faster than the recording speed of a printer or the like, and there may be a time delay from the input of image information to recording by the printer. In view of this, it is preferable that the input electrical signals be temporarily stored in a memory and sequentially read out for printing. If the manual input operation is relatively slow so as to match with the recording speed, since the manual subscanning speed is irregular, the recording speed is also rendered irregular and stable recording cannot be performed. On the other hand, if the manual input operation is too fast, the amount of input information may exceed the capacity of the memory, and new image information may be recorded in a memory area from which image information has not been read out for recording.

Figure 3:
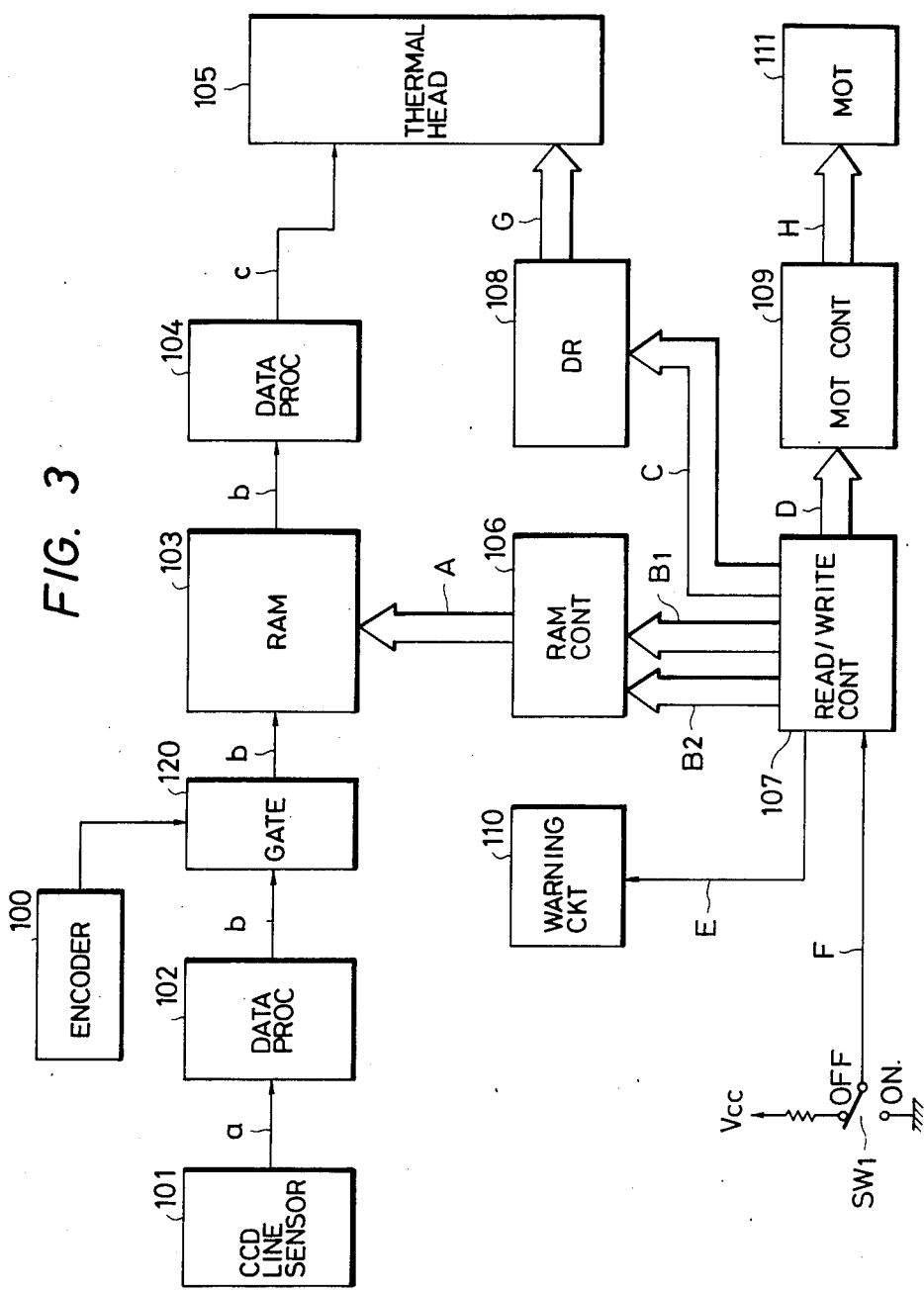
FIG. 3 is a block diagram showing the configuration of the apparatus according to the embodiment of the present invention.

FIG. 3 is a block diagram showing the configuration of the apparatus according to the first embodiment of the present invention. The line sensor 101 converts the image information of the original into an analog image signal a of a predetermined period and supplies it to a data processing circuit 102. The data processing circuit 102 performs digitization, A/D conversion and the like of the image signal a, and supplies a digital image signal b to a random access memory (to be referred to as a RAM hereinafter) 103 through a gate 120. The encoder 100 supplies a pulse to the gate 120 every time the wheel 9 rotates through a predetermined angle. In response to each pulse received from the encoder 100, the gate 120 transfers a signal b to the RAM 103. The RAM 103 is a buffer memory for temporarily storing the image signal b. A data processing circuit 104 performs necessary correction of the image signal b read out from the RAM 103, and transfers the obtained print signal c to the thermal head 105. The thermal head 105 consists of a shift register circuit having the number of bits corresponding to one line of the print signal c (corresponding to one main scanning operation of the line sensor), a latch circuit and heat-generating resistors. A RAM controlling circuit 106 supplies a control signal A to the RAM 103 so as to set it in one of read, write and hold modes in which the image signal b is read out, written and held, respectively. The write/read operation of the image signal is alternately performed at a short constant period T. A read/write controlling circuit 107 controls the operation of the RAM controlling circuit 106, a thermal head driving circuit 108, a motor controlling circuit 109, and a warning circuit 110. The read/write controlling circuit 107 has a circuit for reading the number of lines N which corresponds to the difference between the number of lines of the image signal b written in the RAM 103 and the number of lines read out therefrom. The circuit 107 controls the circuits 106, 108, 109, and 110 by signals B1, B2, C, D and E in accordance with the number of lines N determined in this manner. A signal F is supplied from the scan switch SW1 to the circuit 107. When the switch SW1 is turned on, reading of image information is started and simultaneously the signal F from the switch SW1 starts operating the read/write controlling circuit 107. The switch SW1 is grounded when it is ON and is connected to a power supply voltage Vcc when it is OFF. In response to the signal C, the thermal head driving circuit 108 supplies to the thermal head 105 a signal G including a latch signal for latching the print signal c in the thermal head 105 and a strobe signal for allowing the head 105 to print in accordance with the latched print signal c. In response to the signal D, the motor controlling circuit 109 controls the motor 111 by a signal H. The warning circuit 110 is incorporated so as to give a warning if the number of lines N is apt to exceed the memory capacity of the RAM 110. The warning circuit 103 is driven by the signal E and comprises an LED, a sound warning circuit or the like.

Figure 4:
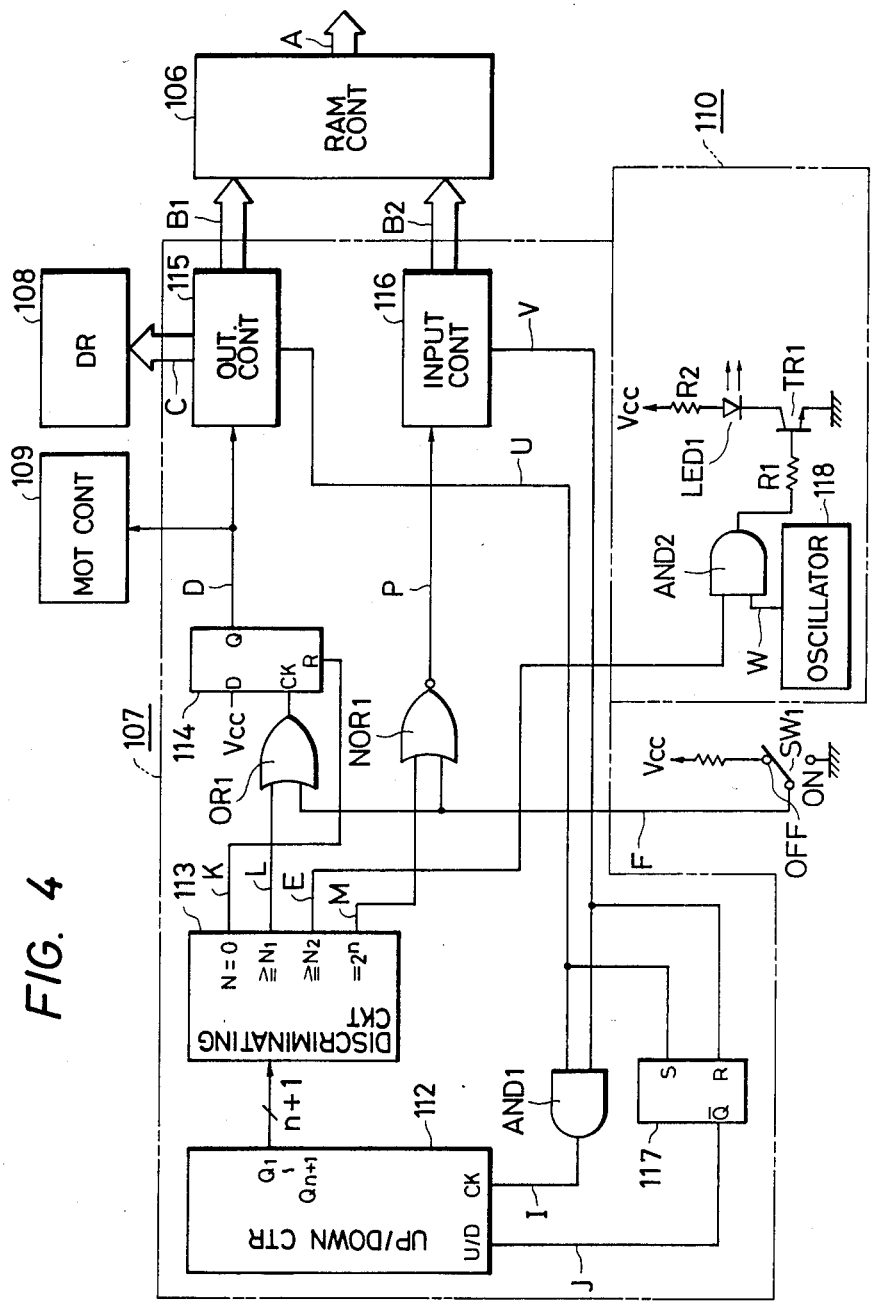
FIG. 4 is a block diagram of an example of a read/write controlling circuit.

FIG. 4 is a block diagram showing the configuration of the read/write controlling circuit 107 in more detail. In FIG. 4, it is assumed that the capacity of the RAM 103 is $2^n$ lines. A count output of an up/down counter 112 has (n+1) bits $Q_1$ to $Q_{n+1}$. An output from the counter 112 allows detection of the number of lines N corresponding to the difference between the number of lines of the image signal stored in the RAM 103 and the number of lines read out therefrom. The up/down counter 112 is started by a signal I and its up/down counting operation is controlled by a signal J (it counts up in response to the high signal J and counts down in response to the low signal J).

Inclined lines and symbols attached to each signal line indicate the number of signal lines therein. A discriminating circuit 113 reads the number of lines N represented by the outputs $Q_1$ to $Q_{n+1}$ from the up/down counter 112, and produces a signal K, L, E or M which corresponds to N=0, N≧N1, N≧N2, N=$2^n$, respectively. It is assumed herein that N1<N2<$2^n$. A D flip-flop 114 receives the signal K as a reset signal and a signal L or F through an OR gate OR1 as a clock signal. A Q output from the D flip-flop 114 is supplied to the motor controlling circuit 109 and to an output controlling circuit 115. The output controlling circuit 115 is operated only when the Q output from the D flip-flop 114 is at high level (to be referred to as high hereinafter) and supplies a signal B1 instructing data readout from the RAM 103 to the RAM controlling circuit 106 and a signal C to the thermal head driving circuit 108. Every time readout of one line of image signal from the RAM 103 is completed, the output controlling circuit 115 generates a negative pulse U. The negative pulse referred to herein is a pulse which is at low level (to be referred to as low hereinafter) for a predetermined period of time from the high level state. When the signals M and F are supplied to a NOR gate NOR1, it supplies a signal P to an input controlling circuit 116. The input controlling circuit 116 is operated only when the signal P is high, and supplies a signal B2 requesting a write operation of the RAM 103 to the RAM controlling circuit 106. At the same time, the input controlling circuit 116 produces a negative pulse V every time one line of image signal is written in the RAM 103. The signals U and V are supplied to an AND gate AND1, an output signal from which is supplied to a clock input terminal CK of the up/down counter 112 as a signal I. An R-S flip-flop 117 receives the signal U at its set input S and the signal V at its reset input R. A $\overline{Q}$ output from the R-S flip-flop 117 is supplied to an input terminal U/D of the up/down counter 112 as the signal J. When the signal from the scan switch SW1 is high, the sensor 101 stops scanning, and when it is low, the sensor 101 scans the original image information.

The warning circuit 110 consists of an oscillator 118, and AND gate AND2, resistors R1 and R2, a transistor TR1 and a light-emitting diode LED1.

Figure 5:
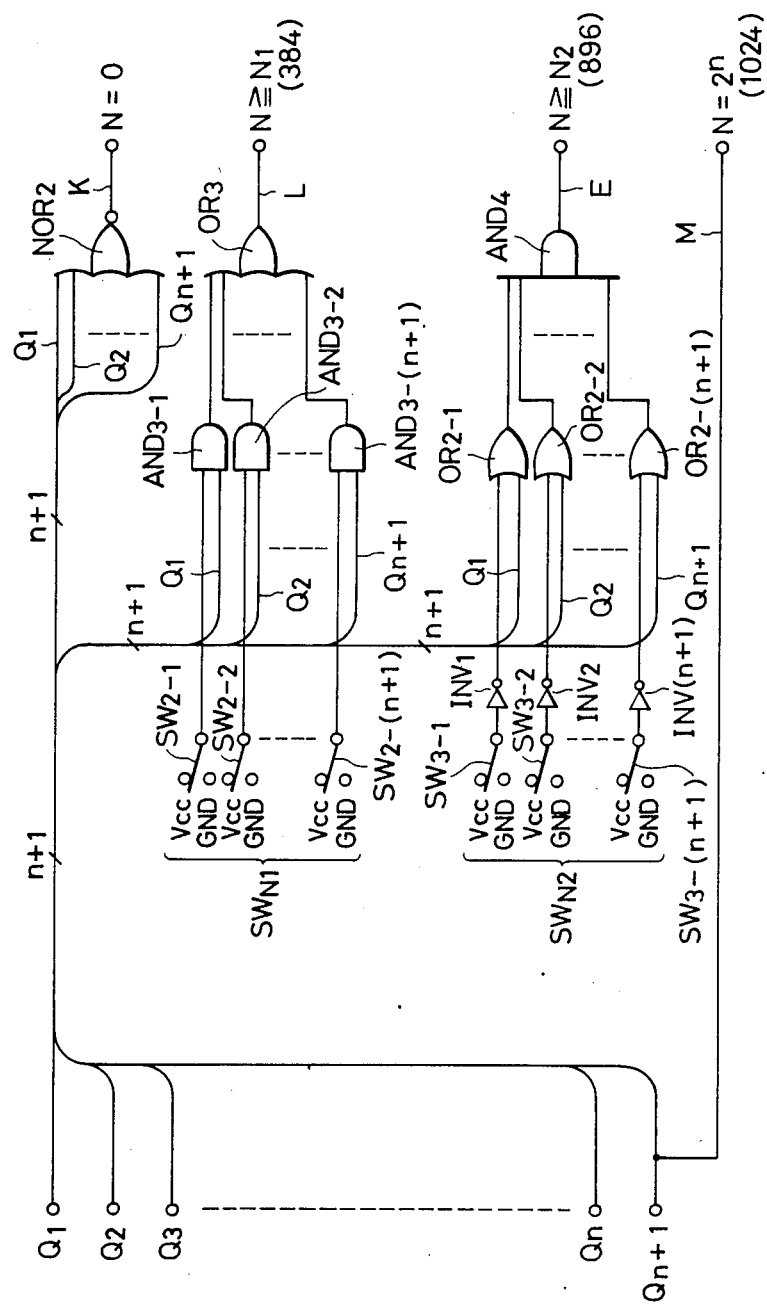
FIG. 5 is a circuit diagram showing an example of a discriminating circuit.

FIG. 5 is a circuit diagram showing an embodiment of the discriminating circuit 113. The (n+1) outputs $Q_1$ to $Q_{n+1}$ are supplied from the up/down counter 112. As in the case of FIG. 4, instead of illustrating (n+1) signal lines, a single line with inclined lines and symbol (n+1) is illustrated for the sake of simplicity. A NOR gate NOR2 has (n+1) input terminals to receive these (n+1) outputs $Q_1$ to $Q_{n+1}$ and produces the signal K.

AND gates $AND_{3-1}$ to $AND_{3-(n+1)}$ receive the outputs $Q_1$ to $Q_{n+1}$ at one terminal and outputs from (n+1) N1 setting switches $SW_{2-1}$ to $SW_{2-(n+1)}$. Outputs from the (n+1) AND gates $AND_{3-1}$ to $AND_{3-(n+1)}$ are supplied to (n+1) input terminals of an OR gate OR3. An output from the OR gate OR3 is produced as the signal L.

Two-input OR gates $OR_{2-1}$ to $OR_{2-(n+1)}$ receive the outputs $Q_1$ to $Q_{n+1}$ at one terminal and are connected to (n+1) N2 setting switches $SW_{3-1}$ to $SW_{3-(n+1)}$ through inverters $INV_1$ to $INV_{(n+1)}$, respectively, at the other terminal. The (n+1) outputs from the OR gates $OR_{2-1}$ to $OR_{2-(n+1)}$ are respectively supplied to an AND gate AND4 through (n+1) input terminals thereof. An output from the AND gate AND4 is produced as the signal E described above. The $Q_{n+1}$ output is directly produced as the signal M.

The mode of operation of the apparatus having the configuration as described above will be described below.

A description will first be made with reference to FIG. 3. Referring to FIG. 3, when the scan switch SW1 is turned on, the reading of the image information is started. When the image signal b is generated through the CCD line sensor 101 and the data processing circuit 102, a signal B2 instructing data write is supplied to the RAM controlling circuit 106 from the read/write controlling circuit 107. The RAM controlling circuit 106 supplies the signal A to the RAM 103, which starts writing the image signal b. When the image signal b corresponding to a predetermined number of lines (to be referred to as N1 lines hereinafter) is written in the RAM 103, the read/write controlling circuit 107 then supplies a read command B1 to the RAM controlling circuit 106. In response to the signal A, readout of the image signal b stored in the RAM 103 begins. The readout image signal b is transferred to the thermal head 105 through the data processing circuit 104 as the print signal c. When transfer of the image signal b corresponding to one line is completed, the read/write controlling circuit 107 starts operating the thermal head driving circuit 108 in accordance with the signal C. The signal G is supplied to the thermal head 105 and latching and printing of the transferred print signal c is performed. As the printing is performed in this manner, the read/write controlling circuit 107 starts operating the motor controlling circuit 109 by the signal D, and the signal H is supplied to the motor 111 to feed the paper.

Assume a case wherein both the write and read commands B2 and B1 are supplied to the RAM controlling circuit 106 from the read/write controlling circuit 107. In this case, the RAM 103 is controlled to alternately allow read and write operations of data at a predetermined period T by the signal A. Parallel read and write operations of the image signal b from and in the RAM 103 can be performed by setting the period T sufficiently shorter than both the time interval in which 1 bit of the image signal b is transferred and held, and the time interval required for transferring 1 bit of the image signal b to the data processing circuit 104. The signal A is supplied to the RAM 103 at intervals to allow storage and holding of the image signal b.

In this manner, when write of the image signal b corresponding to one line in the RAM 103 is comleted, the readout of the first line of the image signal b is started, and thereafter, parallel read/write operations are performed. When it is assumed that the RAM 103 has a memory capacity corresponding to $2^n$ lines of the image signal, after the image signal b is written up to the $2^n$th line, the image signal b can be continuously written returning to the memory area corresponding to the first line of the image signal b already stored therein. Thus, the read/write controlling circuit 107 includes a circuit which counts the number of lines (to be referred to as N lines hereinafter) which is a difference obtained by subtracting the number of lines read out from the RAM 103 from the number of lines of the image signal written in the RAM 103. The number of lines N changes in accordance with the reading speed of the image information by the operator and the printing speed of the thermal printer. However, the number of lines N must satisfy inequality: $0 \leq N \leq 2^n$.

The read/write controlling circuit 107 performs the following control. Assume a case wherein the reading speed of the image information is faster than the printing speed of the thermal head, and the number of lines N is about to exceed $2^n$. In this case, the value of N is set to be N2 which is slightly smaller than $2^n$. When the value of N exceeds N2, the circuit 107 generates the signal E to warn the operator by the warning circuit 110 that the reading speed must be decreased. When the value of N has reached $2^n$ irrespective of this warning operation, generation of the write command B2 is stopped in order to protect the image signal b stored in the RAM 103 and to prohibit write of a new image signal b therein. On the other hand, when the reading speed of the image data is smaller than the printing speed of the thermal head and the value of N has reached 0, generation of the signals B1 and C is stopped, and the signal D is set low so as to stop readout of the image signal b from the RAM 103, printing by the thermal head and driving of the motor. Thus, after the image signal b is written in the RAM 103 and N=N1, the circuit 107 generates the signals B1 and C, and the signal D is set high so as to allow readout of the image signal b from the RAM 103, printing by the thermal printer, and driving of the motor. When the operator finishes scanning the original, he turns off the scan switch SW1. Then, the readout of the image signal b, printing by the thermal head, and driving of the motor are performed irrespective of the value of N. After the value of N reaches 0, the operation is completed.

The mode of operation of the embodiment of the read/write controlling circuit 107 will be described with reference to FIG. 4.

When the scan switch SW1 is turned on and the signal F goes low, the signal M is also low. Therefore, the signal P goes high through the NOR circuit NOR1, the input controlling circuit 116 starts operating, and the signal B2 is supplied to the RAM controlling circuit 106. Every time write of the image signal b corresponding to one line is completed, a negative pulse signal V is produced by the input controlling circuit 116. The R-S flip-flop 117 is reset by the trailing edge of the signal V and a $\bar{Q}$ output from the R-S flip-flop 117 goes high. The $\bar{Q}$ output from the R-S flip-flop 117 is supplied to the input terminal U/D of the up/down counter 112 as the signal J. In this case, the count up mode of the counter 112 is designated. The signal V is also supplied to one input terminal of the AND gate AND1. Since the signal U received at the other input terminal of the AND gate AND1 is H, the negative pulse signal V is passed through the AND gate AND1 and is supplied to the clock input of the up/down counter 112 as the signal I. The up/down counter 112 counts up by one in response to the leading edge of the signal I. At the time of system energization, the outputs $Q_1$ to $Q_{n+1}$ from the up/down counter 112 are preset at all "0". Therefore, every time the signal V is supplied to the counter 112, the counter 112 counts up from zero to thereby count the number of lines of the image signal b which have been written in the RAM 103. When the count of the counter 112 reaches N1, the output signal L from the discriminating circuit 113 goes high, and this high output signal is supplied to one input terminal of the OR gate OR1. Since the signal F supplied to the other input terminal of the OR gate OR1 is low, the output from the OR gate OR1 goes high. Then, the output controlling circuit 115 starts operating and produces the signal B1. Every time the image signal b corresponding to one line is read out, the output controlling circuit 115 generates a negative pulse signal U. The R-S flip-flop 117 is set by the trailing edge of the signal U, and the $\bar{Q}$ output therefrom goes low. In response to this $\bar{Q}$ output, the up/down counter 112 is set in the count down mode. At the same time, the signal U is supplied to one input terminal of the AND gate AND1. Since the signal V at the other input terminal of the AND gate AND1 is high, the negative pulse signal V is passed through the AND gate AND1 and is supplied as the signal I to the clock input terminal CK of the up/down counter 112. The counter 112 counts down by one in response to the leading edge of the signal I.

The Q output from the D flip-flop 114 is supplied to the motor controlling circuit 109 as the signal D. The signal C is supplied to the thermal head driving circuit 108 from the output controlling circuit 115. In this manner, the motor and thermal head are driven for printing. Since write and read operations of the image signal b in and from the RAM 103 are alternately performed in units of bits of the signal b at the period T, an end of write operation of the image signal b corresponding to one line and an end of read operation thereof are separated by at least a time period T/2. Therefore, the signals U and V are not produced completely simultaneously. The pulse widths of the signals U and V are adjusted so that control of the up/down counter 112 by the R-S flip-flop 117 and the AND gate AND1 will not be interfered with.

When the write speed of the image signal b in the RAM 103 is faster than the readout speed thereof, the count-up operation of the counter 112 is performed more frequently than the count-down operation thereof. Therefore, the value of N is gradually increased. When the value of N exceeds N2, the output signal E from the discrimination circuit 113 goes high. The signal E is supplied to one input terminal of the AND gate AND2. Then, the LED1 flashes at the period of the output signal W from the oscillator 118 which is supplied to the other input terminal of the AND gate AND2. The flashing of the LED1 indicates that the RAM 103 is almost full to its capacity. When the value of N is further increased and reaches $2^n$ corresponding to the capacity of the RAM 103, the output signal M from the discriminating circuit 113 goes high. The signal M is supplied to one input terminal of the NOR gate NOR1, which produces a low output signal P. The input controlling circuit 116 then stops operating and ceases to generate the signal B2, thereby forcibly prohibiting writing of the image signal b in the RAM 103.

When the write speed of the image signal b in the RAM 103 is slower than the readout speed thereof from the RAM 103, the up/down counter 112 counts down more frequently than it counts up, and the value of N gradually decreases. When the value of N becomes equal to 0, the output signal K from the discriminating circuit 113 goes high. The D flip-flop 114 is reset by the signal D, and its Q output goes low. The output controlling circuit 115, the motor controlling circuit 109 and the thermal head driving circuit 108 stop operating, and the signal B1 is disabled. Then, the read operation from the RAM 103 is stopped. Read operation of the image signal b from the RAM 103 is prohibited until the value of N increases again and reaches N1. However, when the operator turns off the scan switch SW1 to stop reading of the image information before the value of N increases to N1 again, the signal F goes high. Therefore, the signal F is supplied to the clock input terminal CK of the D flip-flop 114 through the OR gate OR1, and the Q output from the D flip-flop 114 goes high. The readout of the image signal b from the RAM 103 and driving of the thermal head and the motor are started again.

The mode of operation of a simple embodiment of the discriminating circuit 113 will be described with reference to FIG. 5.

When all the (n+1) outputs $Q_1$ to $Q_{(n+1)}$ of the up/down counter 112 are low, i.e., when N=0, the output signal K from the NOR gate NOR2 goes high, thus enabling detection of N=0. Of (n+1) N1 setting switches $SWN_1$, if (n−m1+2) switches $SW_{2-m1}$ to $SW_{2-(n+1)}$ (where $1 \leq m1 \leq (n+1)$) are set high and all the remaining switches are set low, i.e., grounded, when $N \geq 2^{m1}$ (=N1), the signal L goes high through the AND gates $AND_{3-1}$ to $AND_{3-(n+1)}$ and an OR gate OR3. Of the (n+1) N2 setting switches $SWN_2$, if (n−m2+2) switches $SW_{3-m2}$ to $SW_{3-(n+1)}$ are all set high and all the remaining switches are set low, when $N \geq 2^{n+1} - 2^{m2}$ (=N2), the signal E goes high through the inverters $INV_1$ to $INV_{(n+1)}$, the OR gates $OR_{2-1}$ to $OR_{2-(n+1)}$, and an AND gate AND4. When $N = 2^n$, the output $Q_{n+1}$ goes high, and the signal M goes high, thereby detecting that $N = 2^n$.

In the embodiment described above, the preset value of N for writing of the signals in the RAM 103 is set at $2^n$. However, there may be a case wherein, in order to correct heat accumulation of the thermal head, the data processing circuit 104 must perform comparison of the image signal of a given line with an image signal of a line a predetermined number of lines preceding thereof, and the processed signal in accordance with the comparison result must be supplied to the thermal head 105. In such a case, when an x previous line is required for comparison, the preset value of N, above which writing of the signals in the RAM 103 is prohibited, must be set at $2^n - x$. Setting of the value of N at such a value is a simple operation.

Figure 6:
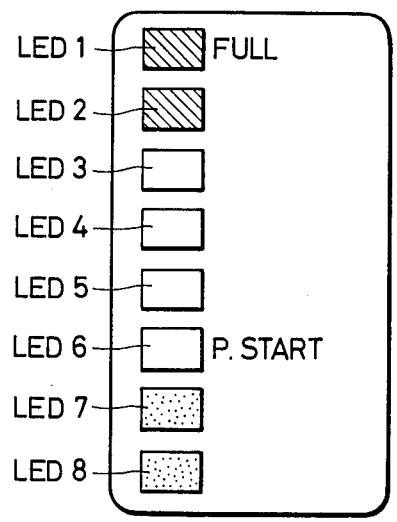
FIG. 6 is a view showing the outer appearance of a display device.
Figure 7:
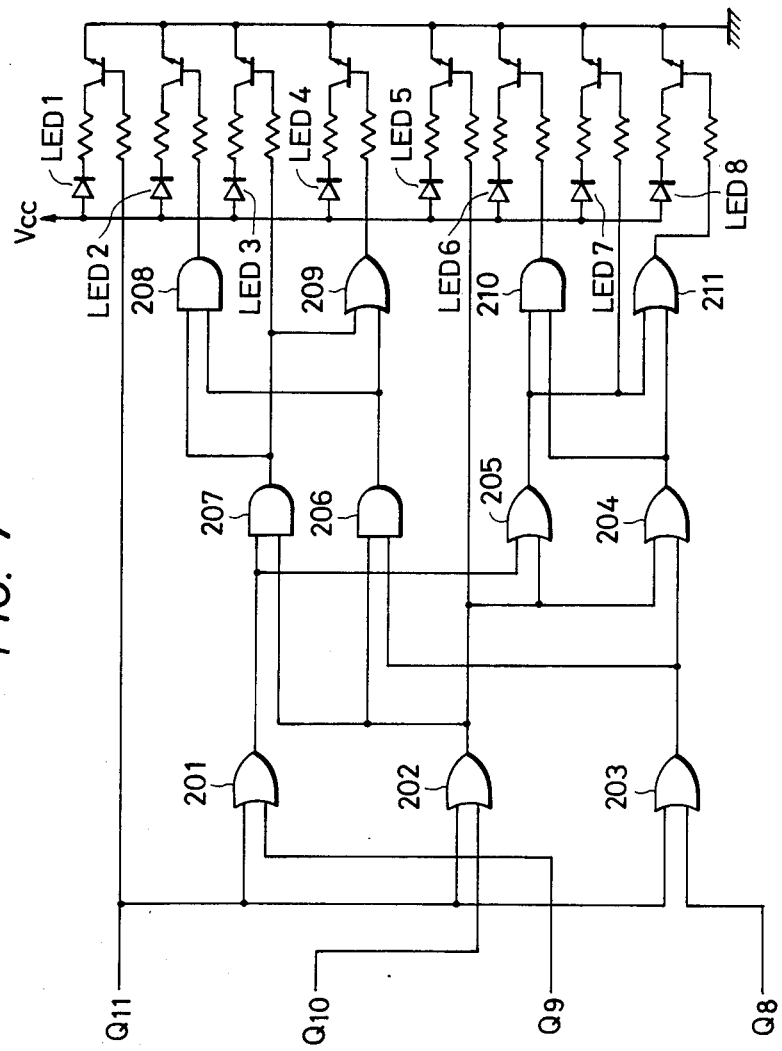
FIG. 7 is a circuit diagram showing an example of a decoder.

FIG. 6 shows an outer appearance of an embodiment of a display device replacing the warning device 110. FIG. 7 is a circuit diagram showing an embodiment of a decoder for display. Assume that n=10, i.e., the number of lines which can be stored in the RAM 103 is 1,024 lines, the number of lines N1 for starting printing is 384, and the number of lines N2 for warning is 896. Then, referring to FIG. 6, each LED of the display device corresponds to 128 lines. When the number of lines written in the memory exceeds 128, an LED 8 is turned on. In a similar manner, an LED 7 is turned on for 256 lines, an LED 6 is turned on for 384 lines, an LED 5 is turned on for 512 lines, an LED 4 is turned on for 640 lines, an LED 3 is turned on for 768 lines, an LED2 is turned on for 892 lines, and an LED 1 is turned on for 1,024 lines. When an upper LED (LED corresponding to a larger number of lines) is turned on, the LEDs lower than this LED are kept ON, thereby providing a bar graph-like display. The LEDs 7 and 8 are turned on in yellow; the LEDs 3, 4, 5 and 6 are turned on in green; and the LEDs 1 and 2 are turned on in red. The three groups of LEDs respectively indicate the state wherein only the write operation in the RAM 103 is performed, the state wherein write and print operations are both performed, and the state wherein the RAM 103 is full. In particular, when the LED 6 is turned on, it indicates that printing is started. When the LED 2 is turned on, the RAM 103 is almost full to its capacity. When the LED 1 is turned on, the RAM 103 is full, and any further scanning operation will not result in storage of the read information and printing.

FIG. 7 shows an example of the decoder. The upper 4-bit outputs Q8, Q9, Q10 and Q11 from the 11-bit up/down counter 112 are supplied, and corresponding LEDs are turned on through a logic circuit consisting of AND and OR gates as shown in FIG. 7. As for the LEDs 1 and 2, when they are flashed using oscillators and gates instead of simply being turned on, a better warning effect is obtained.

When the display device as described above is used, the memory state is easy to confirm. Therefore, the operator of the image recording apparatus can easily control the manual scan speed.

The above embodiment is described with reference to the case of a thermal printer. However, the present invention can be similarly applied to a printer of another type, e.g., an electrostatic printer. Furthermore, a similar effect can also be obtained when the present invention is applied to a magnetic recording apparatus when the thermal head is replaced with a magnetic head and a paper feed mechanism is replaced with a tape drive mechanism.

When the output Q8 goes high, it turns on the LED 8 through OR gates 203, 204 and 211. When the number of lines scanned reaches 256, only the output Q9 goes high. The output Q9 turns on the LED 8 through OR gates 201, 205 and 211. The output from the OR gate 205 turns on the LED 7. When the number of lines reaches 384, the outputs Q8 and Q9 go high, the output Q8 enables an AND gate 210 through the OR gates 203 and 204, and the output Q9 turns on the LED 6 through the OR gates 201 and 205 and the AND gate 210. When the number of lines reaches 512, the output Q10 goes high and turns on the LED 5 through the OR gate 202. When the number of lines reaches 640, the outputs Q10 and Q8 go high, the output Q10 enables an AND gate 206 through the OR gate 202, and the output Q8 turns on the LED 4 through an AND gate 206 and an OR gate 209. When the number of lines reaches 768, the outputs Q9 and Q10 go high, and the output Q9 turns on the LED 3 through the OR gate 201 and an AND gate 207 which is enabled by the output Q10. When the number of lines reaches 896, the outputs Q8, Q9 and Q10 go high, and the output Q8 turns on the LED 2 through AND gates 206 and 208 which are enabled by the outputs Q9 and Q10. When the number of lines reaches 1,024, the output Q11 turns on the LED 1.

Figure 8:
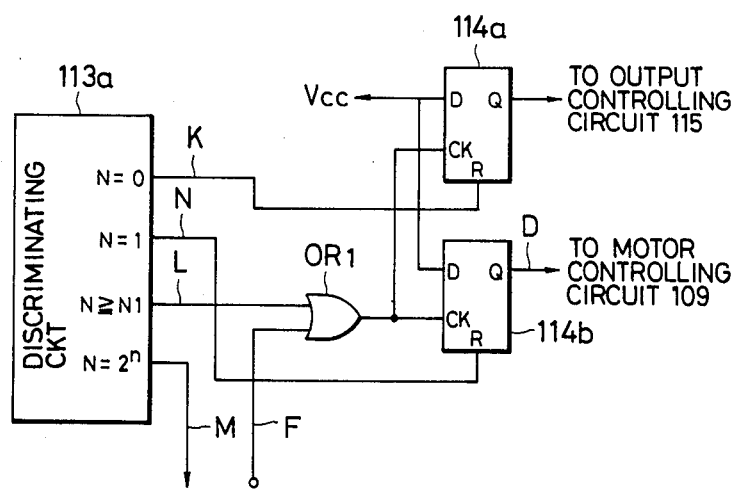
FIG. 8 is a block diagram showing an apparatus according to another embodiment of the present invention.

In the block diagram shown in FIG. 8, the discriminating circuit 113 and the D flip-flop 114 in the circuit shown in FIG. 4 are replaced by a discriminating circuit 113a and D flip-flops 114a and 114b. The remaining circuit components are the same in FIGS. 4 and 8. However since the signal E is not generated, the circuit shown in FIG. 8 does not have the warning circuit 110.

The discriminating circuit 113a reads the number of lines N which is represented by the outputs $Q_1$ to $Q_{n+1}$ from an up/down counter 112. The circuit 113a generates signals K, N, M and L in accordance with whether the value of N is equal to 0, 1, $2^n$, and a preset value N1, respectively. The D flip-flip 114a receives the signal K as a reset signal, and receives the signal L or H supplied through an OR circuit OR1 as a clock signal. The D flip-flop 114b receives the signal N as a reset signal, and the signal L or F supplied through the OR circuit OR1 as a clock signal. The Q output from the D flip-flop 114a is supplied to the input terminal of an output controlling circuit 115, and the Q output from the D flip-flop 114b is supplied to the input terminal of a motor controlling circuit 109 as the signal D. The data terminals D of the D flip-flops 114a and 114b are both connected to a positive terminal Vcc of a power supply. The output controlling circuit 115 is operative only when the Q output from the D flip-flop 114a is high.

The circuit as described above generates the signal D for stopping the motor when N=1. For this reason, irregular printing on thermal paper due to inertial rotation of the motor as the signal D is generated when N=0 can be avoided, as shown in FIG. 4.

What is claimed is:

1. An image reading apparatus for reading an image of an object, including:
   (a) converting means for converting the image of the object into an image signal;
   (b) memory means;
   (c) writing means for writing the image signal into said memory means;
   (d) reading means for reading out the image signal written in said memory means;
   (e) detecting means for detecting a difference between an amount of the image signal written in said memory means by said writing means and an amount of the image signal read out from said memory means by said reading means and for producing a detection signal upon detecting that said detected difference has reached a predetermined value; and
   (f) means for producing a warning signal in response to said detection signal.

2. An image reading apparatus for reading an image of an object, including:
   (a) converting means for converting the image of the object into an image signal;
   (b) memory means having a predetermined capacity;
   (c) writing means for writing the image signal into said memory means;
   (d) reading means for reading out the image signal written in said memory means;
   (e) detecting means for detecting a difference between an amount of the image signal written in said memory means by said writing means and an amount of the image signal read out from said memory means by said reading means and for producing a detection signal upon detecting that said detected difference has reached a value which corresponds to said predetermined capacity; and
   (f) means for prohibiting aaid writing means from writing said image signal into said memory means in response to said detection signal.

3. An image reading apparatus for reading an image of an object, including:
   (a) converting means for converting the image of the object into an image signal;
   (b) memory means;
   (c) writing means for writing the image signal into said memory means;
   (d) reading means for reading out the image signal written in said memory means;
   (e) detecting means for detecting a difference between an amount of the image signal written in said memory means by said writing means and an amount of the image signal read out from said memory means by said reading means and for producing a detection signal upon detecting that said detected difference has reached a predetermined value; and
   (f) means for prohibiting said reading means from reading out said image signal from said memory means in response to said detection signal.

4. An apparatus according to claim 3, further including:
   (a) a recording medium;

(b) recording means for recording the image signal read out from said memory means by said reading means; and (c) means for prohibiting an operation of said recording means in response to the detection signal.

5. An image reading apparatus for reading an image of an object, including:

(a) converting means for converting the image of the object into an image signal;

(b) memory means;

(c) writing means for writing the image signal into said memory means;

(d) reading means for reading out the image signal written in said memory means;

(e) detecting means for detecting a difference between an amount of the image signal written in said memory means by said writing means and an amount of the image signal read out from said memory means by said reading means; and (f) display means responsive to said detecting means to display said difference detected by said detecting means.

* * * * *